US008282477B2

(12) United States Patent
Dasgupta et al.

(10) Patent No.: US 8,282,477 B2
(45) Date of Patent: Oct. 9, 2012

(54) WAGERING GAME MACHINE PROVIDING A WRITE ONCE RUN ANYWHERE ENVIRONMENT

(75) Inventors: Ranjan Dasgupta, Naperville, IL (US); Vernon W. Hamlin, Lisle, IL (US); Mark J. Saletnik, Mount Prospect, IL (US)

(73) Assignee: WMS Gaming Inc., Waukegan, IL (US)

( * ) Notice: Subject to any disclaimer, the term of this patent is extended or adjusted under 35 U.S.C. 154(b) by 329 days.

(21) Appl. No.: 12/595,460

(22) PCT Filed: Apr. 10, 2008

(86) PCT No.: PCT/US2008/004630

§ 371 (c)(1), (2), (4) Date: Oct. 9, 2009

(87) PCT Pub. No.: WO2008/124179

PCT Pub. Date: Oct. 16, 2008

(65) Prior Publication Data

US 2010/0137058 A1 Jun. 3, 2010

Related U.S. Application Data

(60) Provisional application No. 60/910,924, filed on Apr. 10, 2007.

(51) Int. Cl.
*A63F 13/00* (2006.01)

(52) U.S. Cl. ........................................... 463/29; 463/42

(58) Field of Classification Search .................... 463/29, 463/42

See application file for complete search history.

(56) References Cited

U.S. PATENT DOCUMENTS

| | | | | |
|---|---|---|---|---|
| 5,643,086 | A | 7/1997 | Alcorn et al. | |
| 7,025,674 | B2 | 4/2006 | Adams et al. | |
| 7,290,072 | B2 | 10/2007 | Quraishi et al. | |
| 7,515,718 | B2 | 4/2009 | Nguyen et al. | |
| 7,794,323 | B2 | 9/2010 | Cannon | |
| 7,798,900 | B2 | 9/2010 | Nguyen | |
| 7,819,750 | B2 | 10/2010 | Lam et al. | |
| 8,057,302 | B2 * | 11/2011 | Wells et al. | 463/29 |
| 2001/0003714 | A1 | 6/2001 | Takata et al. | |
| 2001/0009868 | A1 | 7/2001 | Sakaguchi et al. | |

(Continued)

FOREIGN PATENT DOCUMENTS

EP 1462946 A1 9/2004

(Continued)

OTHER PUBLICATIONS

"International Application No. PCT/US2008/04630, Search Report and Written Opinion mailed Aug. 25, 2008", 11pgs.

(Continued)

*Primary Examiner* — Peter DungBa Vo
*Assistant Examiner* — Jeffrey Wong
(74) *Attorney, Agent, or Firm* — Schwegman Lundberg & Woessner, P.A.

(57) ABSTRACT

Systems and methods include determining a hardware configuration in accordance with the detection of the presence or absence of hardware modules on a wagering game machine. Various services are selected base on the hardware configuration, where the service selected provides an interface to a wagering game. The services provide an abstraction of various functions provided by various hardware platforms upon which the wagering game may execute, and take into account differences in the platforms.

24 Claims, 6 Drawing Sheets

U.S. PATENT DOCUMENTS

| | | | |
|---|---|---|---|
| 2001/0049303 A1 | 12/2001 | Found et al. | |
| 2003/0069070 A1 | 4/2003 | Alcorn et al. | |
| 2003/0083943 A1 | 5/2003 | Adams et al. | |
| 2003/0130032 A1 | 7/2003 | Martinek et al. | |
| 2004/0198494 A1 | 10/2004 | Nguyen et al. | |
| 2004/0254006 A1 | 12/2004 | Lam et al. | |
| 2004/0254014 A1 | 12/2004 | Quraishi et al. | |
| 2005/0054423 A1 | 3/2005 | Wadleigh | |
| 2008/0254850 A1 | 10/2008 | Sylla | |
| 2008/0254880 A1* | 10/2008 | Dreyer et al. | 463/31 |
| 2008/0287199 A1 | 11/2008 | Macika et al. | |

FOREIGN PATENT DOCUMENTS

| | | | |
|---|---|---|---|
| WO | WO-2006121933 A2 | 11/2006 | |
| WO | WO-2006121933 A3 | 11/2006 | |
| WO | WO-2007013969 A2 | 2/2007 | |
| WO | WO-2007013969 A3 | 2/2007 | |

OTHER PUBLICATIONS

"U.S. Appl. No. 11/913,701, Non Final Office Action mailed Nov. 18, 2010", 7 pgs.

"U.S. Appl. No. 11/995,970, Non-Final Office Action mailed Oct. 27, 2010", 11 pgs.

"Australian Application Serial No. 2008236580, Office Action mailed Feb. 20, 2012", 2 pgs.

"International Search Report Application No. PCT/US2006/17545", (Dec. 19, 2006), 4 pgs.

"Written Opinion of the International Searching Authority Application No. PCT/US2006/17545", (Dec. 19, 2006), 6 pgs.

* cited by examiner

WAGERING GAME MACHINE PROVIDING A WRITE ONCE RUN ANYWHERE ENVIRONMENT

RELATED APPLICATIONS

This patent application claims the priority benefit of U.S. Provisional Patent Application Ser. No. 60/910,924 filed Apr. 10, 2007 and entitled "WAGERING GAME MACHINE PROVIDING A WRITE ONCE RUN ANYWHERE ENVIRONMENT", the content of which is incorporated herein by reference in its entirety.

LIMITED COPYRIGHT WAIVER

A portion of the disclosure of this patent document contains material which is subject to copyright protection. The copyright owner has no objection to the facsimile reproduction by anyone of the patent disclosure, as it appears in the Patent and Trademark Office patent files or records, but otherwise reserves all copyright rights whatsoever. Copyright 2006, 2007, 2008 WMS Gaming, Inc.

FIELD

Embodiments of the inventive subject matter relate generally to wagering game systems, and more particularly, to wagering game machines providing a write once, run anywhere environment.

BACKGROUND

Wagering game machine makers continually provide new and entertaining games. One way of increasing entertainment value associated with casino-style wagering games (e.g., video slots, video poker, video black jack, and the like) includes offering a variety of base games and bonus events. However, despite the variety of base games and bonus events, players often lose interest in repetitive wagering gaming content. In order to maintain player interest, wagering game machine makers frequently update wagering game content with new game themes, game settings, bonus events, game software, and other electronic data.

In addition to the drive to provide a variety of different wagering games, improved technology and consumer demand has led to the development of a variety of different hardware platforms and system software for the hardware platforms. In typical systems, a wagering game is programmed such that it must run on a particular platform or system software. As a result, wagering games must be ported (e.g. translated) to run on different hardware or system software. The porting or translation of a wagering game to run on an alternative platform can be a very expensive undertaking, both in time and money.

BRIEF DESCRIPTION OF THE FIGURES

Embodiments of the invention are illustrated by way of example and not limitation in the Figures of the accompanying drawings in which.

DESCRIPTION OF THE EMBODIMENTS

Example Operating Environment

Example Wagering Game Machine Architecture

Figure 1:
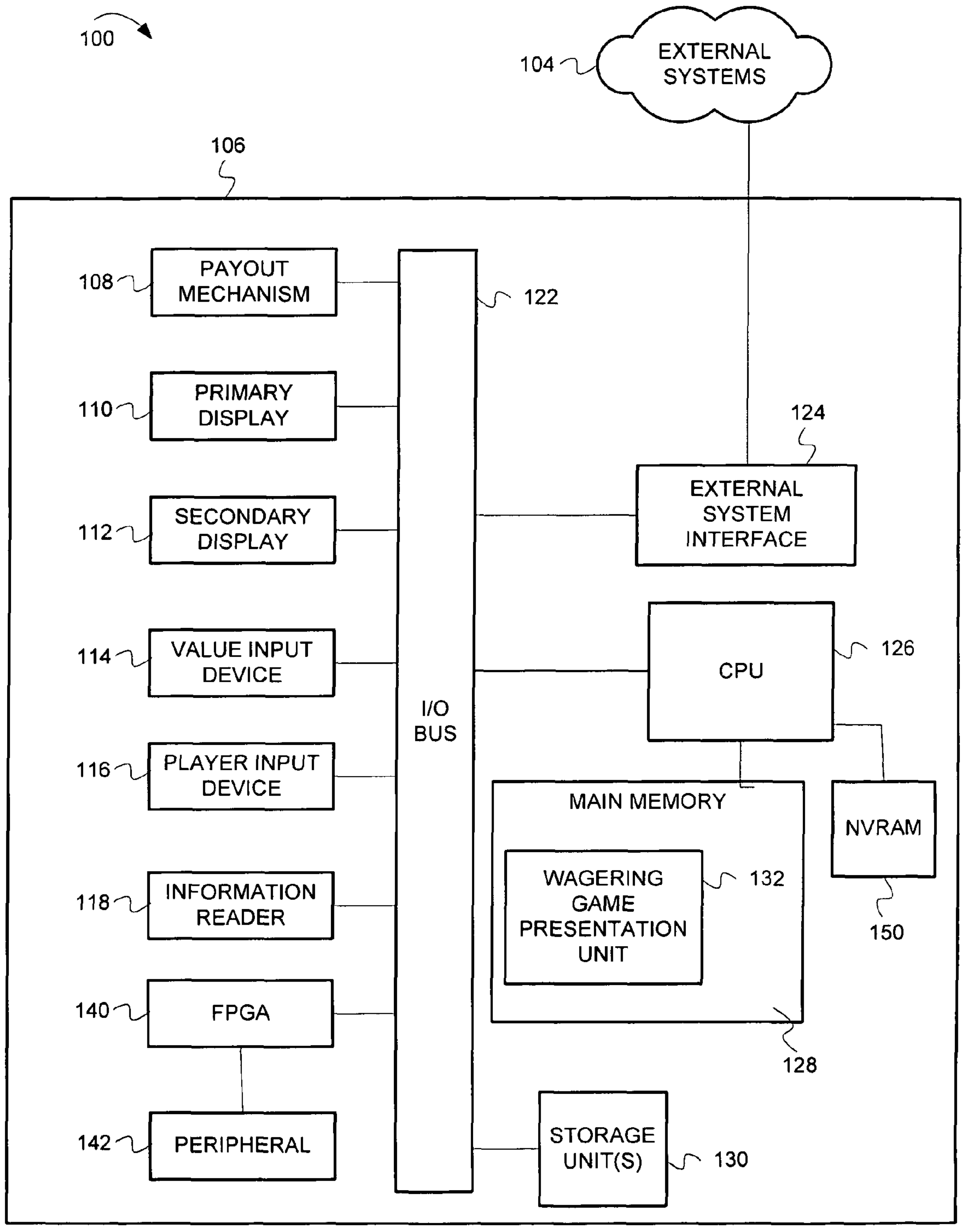
FIG. 1 is a block diagram illustrating a wagering game machine architecture, including a control system, according to example embodiments of the invention.

FIG. 1 is a block diagram illustrating a wagering game machine architecture, including a control system, according to example embodiments of the invention. As shown in FIG. 1, the wagering game machine 106 includes a central processing unit (CPU) 126 connected to main memory 128, which includes a wagering game presentation unit 132. In one embodiment, the wagering game presentation unit 132 can present wagering games, such as video poker, video black jack, video slots, video lottery, etc., in whole or part.

The CPU 126 is also connected to an input/output (I/O) bus 122, which facilitates communication between the wagering game machine's components. The I/O bus may vary in different architectures. For example, in some architectures, the bus is an ISA bus. In alternative architectures, the bus may be a PC bus. The I/O bus 122 is connected to a payout mechanism 108, primary display 110, secondary display 112, value input device 114, player input device 116, information reader 118, NVRAM (Non-Volatile Random Access Memory) 150 and storage unit 130. The player input device 116 can include the value input device 114 to the extent the player input device 116 is used to place wagers. The I/O bus 122 is also connected to an external system interface 124, which is connected to external systems 104 (e.g., wagering game networks).

NVRAM 150 may be any type of NVRAM that maintains data across reboots or power on/off cycles of the wagering game machine.

Storage unit 130 may be any type of persistent storage unit that maintains data across reboots or power on/off cycles of the wagering game machine such that the data is persistent across reboots or power on/off cycles. Examples of such storage units include hard disks, CD-ROM drives, DVD-ROM drives, flash memory, compact flash memory etc.

Some embodiments include an FPGA (Field Programmable Gate Array) 140. In general, an FPGA comprises a semiconductor device containing programmable logic components and programmable interconnects. The programmable logic components can be programmed to provide AND, OR, XOR, NOT logic, or more complex combinational functions such as decoders or simple math functions. The programmable logic components of an FPGA (also referred to as logic blocks) may also include memory elements.

Programmable interconnects allow the logic blocks of an FPGA to be interconnected in various ways. The logic blocks and interconnects can be programmed after the FPGA has been manufactured by a customer or designer so that the FPGA can perform whatever logical function is desired.

In some embodiments, FPGA 140 may be used to control peripherals 142. For example, peripherals 142 may comprise a set of lights for wagering game machine 100 and the FPGA may be programmed to turn lights in the set on or off based on input received by the FPGA. In some embodiments, the FPGA 140 may have a version or revision level encoded on the FPGA.

In one embodiment, the wagering game machine 106 can include additional peripheral devices and/or more than one of each component shown in FIG. 1. For example, in one embodiment, the wagering game machine 106 can include multiple external system interfaces 124, multiple storage units 130 and/or multiple CPUs 126. In one embodiment, any of the components can be integrated or subdivided. Additionally, in one embodiment, the components of the wagering game machine 106 can be interconnected according to any suitable interconnection architecture (e.g., directly connected, hypercube, etc.).

In one embodiment, any of the components of the wagering game machine 106 can include hardware, firmware, and/or software for performing the operations described herein. Machine-readable media includes any mechanism that provides (e.g., stores and/or transmits) information in a form readable by a machine (e.g., a wagering game machine, computer, etc.). For example, tangible machine-readable media includes read only memory (ROM), random access memory (RAM), magnetic disk storage media, optical storage media, flash memory machines, etc. Machine-readable media also includes any media suitable for transmitting software over a network.

Figure 2:
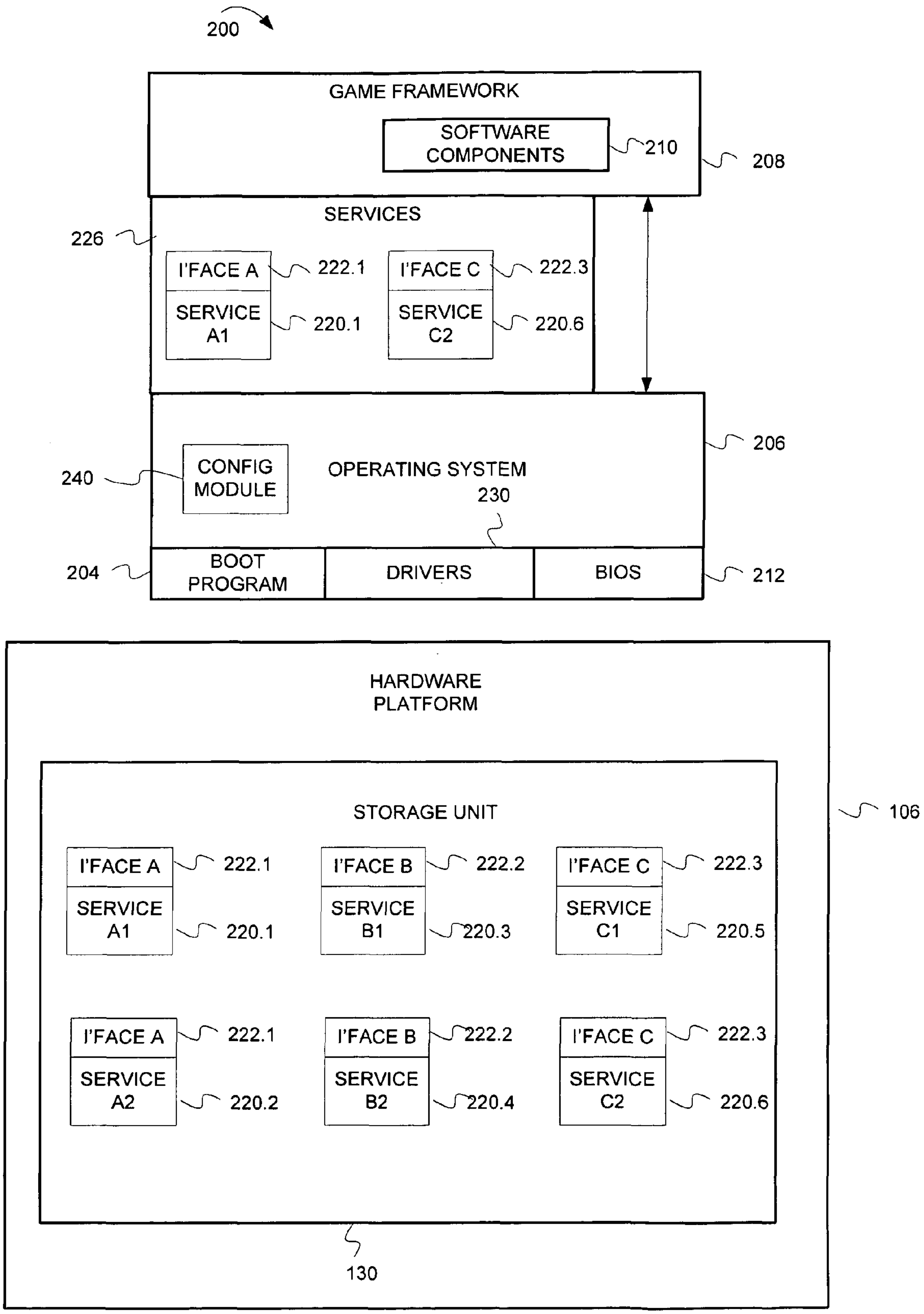
FIG. 2 is a block diagram of a software and hardware architecture for a wagering game machine, according to example embodiments of the inventive subject matter.

While FIG. 1 describes example embodiments of a wagering game machine architecture, FIG. 2 shows a software architecture 300 and the relationship of the software architecture to elements of a hardware architecture for a wagering game machine.

Referring now to FIG. 2, there is illustrated a block diagram of a software architecture 200 for a wagering game machine, according to example embodiments of the inventive subject matter. As shown in FIG. 2, the wagering game architecture includes a hardware platform 106, a boot program 204, an operating system 206, a services layer 226 and a game framework 208 that includes one or more wagering game software components 210. The boot program 204 may include a basic input/output system (BIOS) or other initialization program that works in conjunction with the operating system 206 and/or core operating system 212 to provide a software interface to the hardware platform 106.

In some embodiments, operating system 206 is a version of the Linux operating system. However, the embodiments are not limited to a particular operating system and other operating systems may be used and are within the scope of the inventive subject matter.

The game framework 208 may include standardized game software components either independent or in combination with specialized or customized game software components that are designed for a particular wagering game. In one example embodiment, the wagering game software components 210 may include software operative in connection with the hardware platform 106 and operating system 206 to present wagering games, such as video poker, video black jack, video slots, video lottery, etc., in whole or part. According to another example embodiment, the software components 210 may include software operative to accept a wager from a player. According to another example embodiment, one or more of the software components 210 may be provided as part of the operating system 206 or other software used in the wagering game system 200 (e.g., libraries, daemons, common services, etc.).

Storage unit 130 may provide various services 220, where the services provide an interface 222. In general, services 220 comprise software that provides an abstraction for a device or set of functions provide on a wagering game machine. For example, a service 220 may provide an abstraction for a video device. The software running on the service may emulate functions that are not provided natively by a video card on the wagering game machine while allowing the video card to handle those functions that it can handle. For example, assume that services 220.1 and 220.2 provide an abstraction of video services. Service 220.1 may be run in one configuration for one type or version of a video card, while service 220.2 may be run when a different version or type of video card is present. One of the video cards may provide a rendering engine while the other does not. In either case, the interface 220.1 provided by services 220.1 and 220.2 may be same interface, where one of the services provides rendering software to make up for the lack of a rendering engine in one of the video cards. Thus the software components 210 of the framework may only need to provide an interface to the service, and may run the same way regardless of the capabilities or API (Application Programming Interface) of the underlying video hardware.

Similarly, services 220.3 and 220.4 may provide an abstraction for other functions, such as communications functions, while services 220.5 and 220.6 may provide an abstraction for sound or audio services. Again, the interface provided for a family of services is the same, the underlying service that is run handles the variations in the hardware that is present in varying implementations.

A service 220 may be implemented as a daemon process or other background processing mechanism provided by operating system 206. An wagering game application or software component may communicate with a service using any of a variety of interprocess communications (IPC) mechanisms, including sockets, queues, named pipes, message queues, shared memory etc.

In some embodiments, a configuration module 240 may be executed to determine at runtime what hardware is present and determine which services should be executed based on the presence or absence of particular hardware. The services are initialized and run. In the example shown in FIG. 2, services 220.1 and 220.6 have been selected for execution based on the hardware present.

Although configuration module 240 is shown as part of operating system 206, configuration module 240 may run at the application level rather than the operating system level in some embodiments.

Additionally, the example illustrated in FIG. 2 shows two versions of services from each family A, B or C, where a family of services provides an abstraction for a particular function (video, audio, communications, security etc.) and where each service handles a particular hardware implementation for the service. It should be noted that more than two services may be provided to account for more than two hardware implementations.

Further details on the operation of the system are provided below with reference to FIG. 3.

Example Methods and Operations

Figure 3:
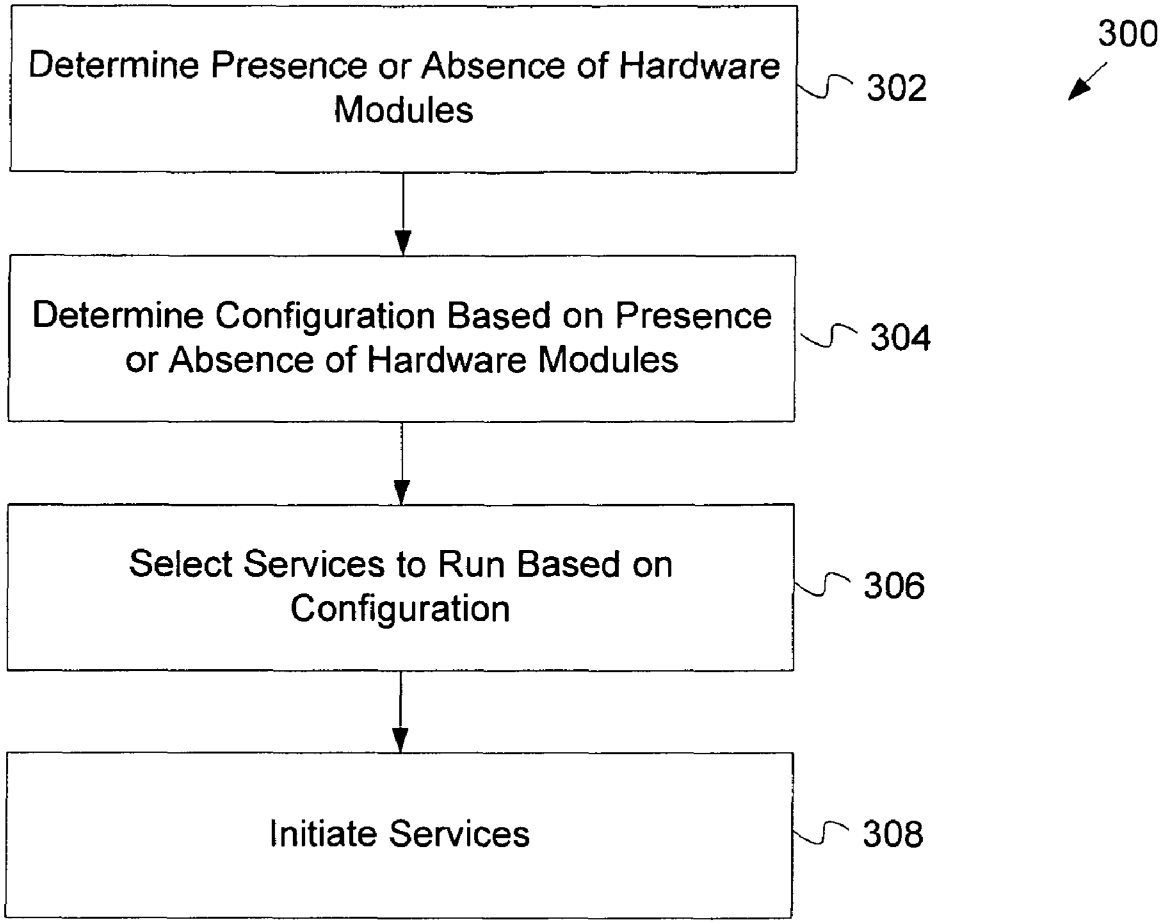
FIG. 3 is a flowchart illustrating a method for loading content on a replacement storage unit according to embodiments of the inventive subject matter.

FIG. 3 is a flowchart illustrating methods for loading content on a replacement storage unit according to embodiments of the inventive subject matter. The method begins at block 302 by determining the presence or absence of hardware modules, or characteristics of the hardware modules. For example, in some embodiments, the presence of an FPGA is detected. Further, a version or revision level of the FPGA may be detected. In alternative embodiments, the number of hardware modules of a particular type may be detected. For example, the number of hard drives, video heads, or network interfaces may be determined. Further, a characteristic such as a size of a memory or storage unit may be determined.

Various mechanisms may be used to detect hardware, including querying a device driver for the hardware status, detecting the presence of a USB peripheral, attempting to open a hardware device, querying a configuration memory for the system etc. The embodiments are not limited to a particular method of detecting the presence or absence of a hardware module.

Next, at block 304 a hardware configurations is determined based on the presence or absence of the hardware modules or hardware characteristics determined a block 302. Various combinations of the presence or absence of hardware modules may be used to determine or infer a particular hardware architecture, version, or configuration.

At block 306, a set of one or more services are selected based on the hardware configuration determined at block 304. The selected services are then initialized (e.g. run) in order to make them available to wagering game applications or other applications that may run on a wagering game machine.

As will be appreciated from the above, the systems and methods described above provide a "write once, run anywhere" environment for a wagering game machine. Wagering game applications may be designed to use the abstracted interface provided by services, and the services may be instantiated based on a hardware configuration that is determined at run-time based on the presence or absence of particular hardware.

Example Wagering Game Network

Figure 4:
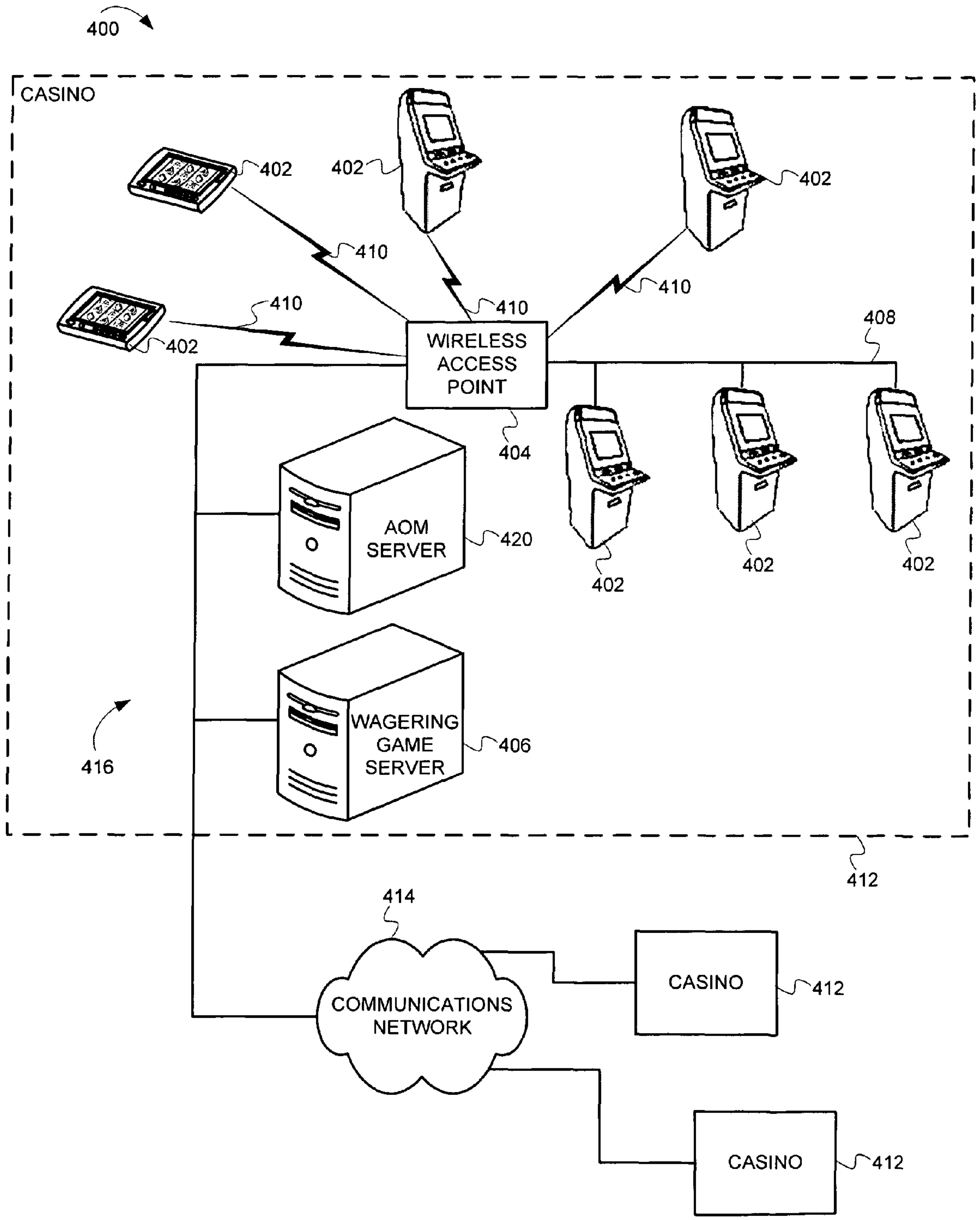
FIG. 4 is a block diagram illustrating a wagering game network, according to example embodiments of the invention.

FIG. 4 is a block diagram illustrating a wagering game network 400, according to example embodiments of the invention. As shown in FIG. 4, the wagering game network 400 may include a plurality of casinos 412 connected to a communications network 414.

Each of the plurality of casinos 412 may include a local area network 416, which may include a wireless access point 404, wagering game machines 402, a wagering game server 406 that can serve wagering games over the local area network 416. Further, wagering game network 416 may be coupled to an AOM (Administration, Operation, and Maintenance) server 420. As such, the local area network 416 includes wireless communication links 410 and wired communication links 408. The wired and wireless communication links can employ any suitable connection technology, such as Bluetooth, 802.11, Ethernet, public switched telephone networks, SONET, etc. In one embodiment, the wagering game server 406 can serve wagering games and/or distribute content to devices located in other casinos 412 or at other locations on the communications network 414.

The wagering game machines 402, wagering game server 406 and AOM server 420 can include hardware and machine-readable media including instructions for performing the operations described herein.

The wagering game machines 402 described herein can take any suitable form, such as floor standing models, handheld mobile units, bartop models, workstation-type console models, etc. Further, the wagering game machines 402 can be primarily dedicated for use in conducting wagering games, or can include non-dedicated devices, such as mobile phones, personal digital assistants, personal computers, etc. In one embodiment, the wagering game network 400 can include other network devices, such as accounting servers, wide area progressive servers, player tracking servers, and/or other devices suitable for use in connection with embodiments of the invention.

AOM server 420 may provide for the administration, operation and maintenance of various machines on network 416, including wagering game machines 402 and wagering game servers 406.

In various embodiments, wagering game machines 402 and wagering game servers 406 work together such that a wagering game machine 402 may be operated as a thin, thick, or intermediate client. For example, one or more elements of game play may be controlled by the wagering game machine 402 (client) or the wagering game server 406 (server). Game play elements may include executable game code, lookup tables, configuration files, game outcome, audio or visual representations of the game, game assets or the like. In a thin-client example, the wagering game server 406 may perform functions such as determining game outcome or managing assets, while the wagering game machine 402 may be used merely to present the graphical representation of such outcome or asset modification to the user (e.g., player). In a thick-client example, game outcome may be determined locally (e.g., at the wagering game machine 402) and then communicated to the wagering game server 406 for recording or managing a player's account.

Similarly, functionality not directly related to game play may be controlled by the wagering game machine 402 (client), the wagering game server 406 or AOM server 420 in embodiments. For example, power conservation controls that manage a display screen's light intensity may be managed centrally (e.g., by the AOM server 420) or locally (e.g., by the wagering game machine 402). Other functionality not directly related to game play may include presentation of advertising, software or firmware updates, system quality or security checks, etc.

It should be noted that while wagering game server 406 and AOM server 420 have been shown as two separate servers, the functionality provided by the servers 406 and 420 may be provide by a single server, or may be distributed across more than two servers.

Example Wireless Environment

In some embodiments, the wireless access point 404 can be part of a communication station, such as wireless local area network (WLAN) communication station including a Wireless Fidelity (WiFi) communication station, or a WLAN access point (AP). In these embodiments, the wagering game machines 402 can be part of a mobile station, such as WLAN mobile station or a WiFi mobile station.

In some other embodiments, the wireless access point 404 can be part of a broadband wireless access (BWA) network communication station, such as a Worldwide Interoperability for Microwave Access (WiMax) communication station, as the wireless access point 404 can be part of almost any wireless communication device. In these embodiments, the wagering game machines 402 can be part of a BWA network communication station, such as a WiMax communication station.

In some embodiments, any of the wagering game machines 402 can part of a portable wireless communication device, such as a personal digital assistant (PDA), a laptop or portable computer with wireless communication capability, a web tablet, a wireless telephone, a wireless headset, a pager, an instant messaging device, a digital camera, a television, a medical device (e.g., a heart rate monitor, a blood pressure monitor, etc.), or other device that can receive and/or transmit information wirelessly.

In some embodiments, the wireless access point 404 and the wagering game machines 402 can communicate RF signals in accordance with specific communication standards, such as the Institute of Electrical and Electronics Engineers (IEEE) standards including IEEE 802.11(a), 802.11(b), 802.11(g), 802.11(h) and/or 802.11(n) standards and/or proposed specifications for wireless local area networks, but they can also be suitable to transmit and/or receive communications in accordance with other techniques and standards. In some BWA network embodiments, the wireless access point 404 and the wagering game machines 402 can communicate RF signals in accordance with the IEEE 802.16-2004 and the IEEE 802.16(e) standards for wireless metropolitan area networks (WMANs) including variations and evolutions thereof However, they can also be suitable to transmit and/or receive communications in accordance with other techniques and standards. For more information with respect to the IEEE 802.11 and IEEE 802.16 standards, please refer to "IEEE Standards for Information Technology—Telecommunications and Information Exchange between Systems"—Local Area Networks—Specific Requirements—Part 11 "Wireless LAN Medium Access Control (MAC) and Physical Layer (PHY), ISO/IEC 8802-11: 1999", and Metropolitan Area Networks—Specific Requirements—Part 16: "Air Interface for Fixed Broadband Wireless Access Systems," Can 2005 and related amendments/versions.

In other embodiments, the wireless access point 404 and the wagering game machines 402 can communicate in accordance with a short-range wireless standard, such as the Bluetooth™ short-range digital communication protocol. Bluetooth™ wireless technology is a de facto standard, as well as a specification for small-form factor, low-cost, short-range radio links between mobile PCs, mobile phones and other portable devices. (Bluetooth is a trademark owned by Bluetooth SIG, Inc.) In other embodiments, the wireless access point 404 and the wagering game machines 402 can communicate in accordance with an ultra-wideband (UWB) communication technique where a carrier frequency is not used. In other embodiments, the wireless access point 404 and the wagering game machines 402 can communicate in accordance with an analog communication technique. In other embodiments, the wireless access point 404 and the wagering game machines 402 can communicate in accordance with an optical communication technique, such as the Infrared Data Association (IrDA) standard. In some embodiments, the wireless access point 404 and the wagering game machines 402 can communicate in accordance with the Home-RF standard which can be in accordance with a Home-RF Working Group (HRFWG) standard.

Example Wagering Game Machines

Example Wagering Game Machine

Figure 5:
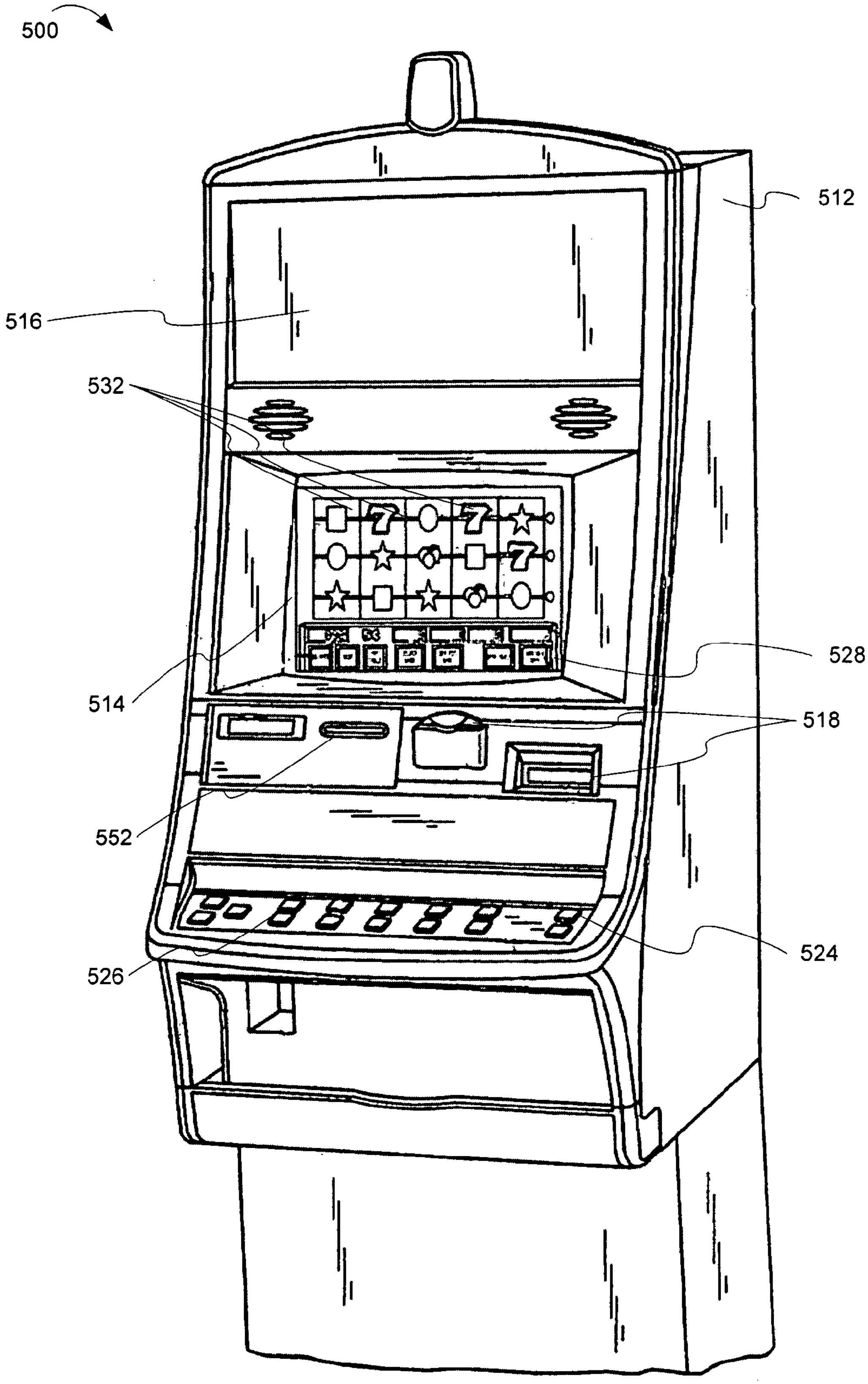
FIG. 5 is a perspective view of a wagering game machine, according to example embodiments of the invention.

FIG. 5 is a perspective view of a wagering game machine, according to example embodiments of the invention. Referring to FIG. 5, a wagering game machine 500 is used in gaming establishments, such as casinos. According to embodiments, the wagering game machine 500 can be any type of wagering game machine and can have varying structures and methods of operation. For example, the wagering game machine 500 can be an electromechanical wagering game machine configured to play mechanical slots, or it can be an electronic wagering game machine configured to play video casino games, such as blackjack, slots, keno, poker, blackjack, roulette, etc.

The wagering game machine 500 comprises a housing 512 and includes input devices, including value input devices 518 and a player input device 524. For output, the wagering game machine 500 includes a primary display 514 for displaying information about a basic wagering game. The primary display 514 can also display information about a bonus wagering game and a progressive wagering game. The wagering game machine 500 also includes a secondary display 516 for displaying wagering game events, wagering game outcomes, and/or signage information. While some components of the wagering game machine 500 are described herein, numerous other elements can exist and can be used in any number or combination to create varying forms of the wagering game machine 500.

The value input devices 518 can take any suitable form and can be located on the front of the housing 512. The value input devices 518 can receive currency and/or credits inserted by a player. The value input devices 518 can include coin acceptors for receiving coin currency and bill acceptors for receiving paper currency. Furthermore, the value input devices 518 can include ticket readers or barcode scanners for reading information stored on vouchers, cards, or other tangible portable storage devices. The vouchers or cards can authorize access to central accounts, which can transfer money to the wagering game machine 500.

The player input device 524 comprises a plurality of push buttons on a button panel 526 for operating the wagering game machine 500. In addition, or alternatively, the player input device 524 can comprise a touch screen 528 mounted over the primary display 514 and/or secondary display 516.

The various components of the wagering game machine 500 can be connected directly to, or contained within, the housing 512. Alternatively, some of the wagering game machine's components can be located outside of the housing 512, while being communicatively coupled with the wagering game machine 500 using any suitable wired or wireless communication technology.

The operation of the basic wagering game can be displayed to the player on the primary display 514. The primary display 514 can also display a bonus game associated with the basic wagering game. The primary display 514 can include a cathode ray tube (CRT), a high resolution liquid crystal display (LCD), a plasma display, light emitting diodes (LEDs), or any other type of display suitable for use in the wagering game machine 500. Alternatively, the primary display 514 can include a number of mechanical reels to display the outcome. In FIG. 5, the wagering game machine 500 is an "upright" version in which the primary display 514 is oriented vertically relative to the player. Alternatively, the wagering game machine can be a "slant-top" version in which the primary display 514 is slanted at about a thirty-degree angle toward the player of the wagering game machine 500. In yet another embodiment, the wagering game machine 500 can exhibit any suitable form factor, such as a free standing model, bartop model, mobile handheld model, or workstation console model.

A player begins playing a basic wagering game by making a wager via the value input device 518. The player can initiate play by using the player input device's buttons or touch screen 528. The basic game can include arranging a plurality of symbols along a payline 532, which indicates one or more outcomes of the basic game. Such outcomes can be randomly selected in response to player input. At least one of the outcomes, which can include any variation or combination of symbols, can trigger a bonus game.

In some embodiments, the wagering game machine 500 can also include an information reader 552, which can include a card reader, ticket reader, bar code scanner, RFID transceiver, or computer readable storage medium interface. In some embodiments, the information reader 552 can be used to award complimentary services, restore game assets, track player habits, etc.

Example Portable Wagering Game Machine

Figure 6:
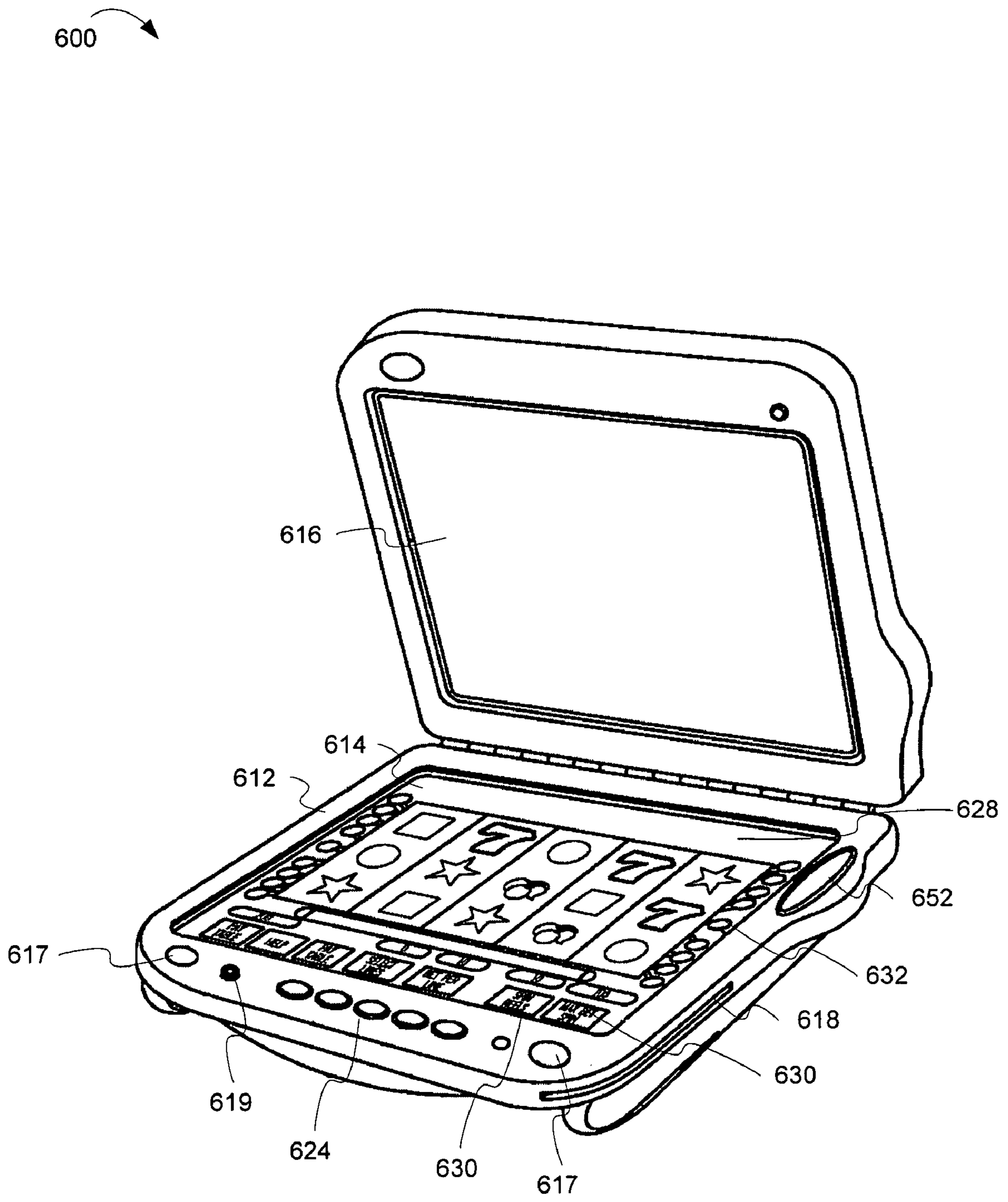
FIG. 6 shows an example embodiment of a portable wagering game machine according to example embodiments of the invention.

FIG. 6 shows an example embodiment of a portable wagering game machine 600. Like free standing wagering game machines, in a handheld or mobile form, the wagering game machine 600 can include any suitable electronic device configured to play a video casino games such as blackjack, slots, keno, poker, blackjack, and roulette. The wagering game machine 600 comprises a housing 612 and includes input devices, including a value input device 618 and a player input device 624. For output, the wagering game machine 600 includes a primary display 614, a secondary display 616, one or more speakers 617, one or more player-accessible ports 619 (e.g., an audio output jack for headphones, a video headset jack, etc.), and other conventional I/O devices and ports, which may or may not be player-accessible. In the embodiment depicted in FIG. 6, the wagering game machine 600 comprises a secondary display 616 that is rotatable relative to the primary display 614. The optional secondary display 616 can be fixed, movable, and/or detachable/attachable relative to the primary display 614. Either the primary display 614 and/or secondary display 616 can be configured to display any aspect of a non-wagering game, wagering game, secondary game, bonus game, progressive wagering game, group game, shared-experience game or event, game event, game outcome, scrolling information, text messaging, emails, alerts or announcements, broadcast information, subscription information, and wagering game machine status.

The player-accessible value input device 618 can comprise, for example, a slot located on the front, side, or top of the housing 612 configured to receive credit from a stored-value card (e.g., casino card, smart card, debit card, credit card, etc.) inserted by a player. The player-accessible value input device 618 can also comprise a sensor (e.g., an RF sensor) configured to sense a signal (e.g., an RF signal) output by a transmitter (e.g., an RF transmitter) carried by a player. The player-accessible value input device 618 can also or alternatively include a ticket reader, or barcode scanner, for reading information stored on a credit ticket, a card, or other tangible portable credit or funds storage device. The credit ticket or card can also authorize access to a central account, which can transfer money to the wagering game machine 600.

Still other player-accessible value input devices 618 can require the use of touch keys 630 on the touch-screen display (e.g., primary display 614 and/or secondary display 616) or player input devices 624. Upon entry of player identification information and, preferably, secondary authorization information (e.g., a password, PIN number, stored value card number, predefined key sequences, etc.), the player can be permitted to access a player's account. As one potential optional security feature, the wagering game machine 600 can be configured to permit a player to only access an account the player has specifically set up for the wagering game machine 600. Other conventional security features can also be utilized to, for example, prevent unauthorized access to a player's account, to minimize an impact of any unauthorized access to a player's account, or to prevent unauthorized access to any personal information or funds temporarily stored on the wagering game machine 600.

The player-accessible value input device 618 can itself comprise or utilize a biometric player information reader which permits the player to access available funds on a player's account, either alone or in combination with another of the aforementioned player-accessible value input devices 618. In an embodiment wherein the player-accessible value input device 618 comprises a biometric player information reader, transactions such as an input of value to the wagering game machine 600, a transfer of value from one player account or source to an account associated with the wagering game machine 600, or the execution of another transaction, for example, could all be authorized by a biometric reading, which could comprise a plurality of biometric readings, from the biometric device.

Alternatively, to enhance security, a transaction can be optionally enabled only by a two-step process in which a secondary source confirms the identity indicated by a primary source. For example, a player-accessible value input device 618 comprising a biometric player information reader can require a confirmatory entry from another biometric player information reader 652, or from another source, such as a credit card, debit card, player ID card, fob key, PIN number, password, hotel room key, etc. Thus, a transaction can be enabled by, for example, a combination of the personal identification input (e.g., biometric input) with a secret PIN number, or a combination of a biometric input with a fob input, or a combination of a fob input with a PIN number, or a combination of a credit card input with a biometric input. Essentially, any two independent sources of identity, one of which is secure or personal to the player (e.g., biometric readings, PIN number, password, etc.) could be utilized to provide enhanced security prior to the electronic transfer of any funds. In another aspect, the value input device 618 can be provided remotely from the wagering game machine 600.

The player input device 624 comprises a plurality of push buttons on a button panel for operating the wagering game machine 600. In addition, or alternatively, the player input device 624 can comprise a touch screen mounted to a primary display 614 and/or secondary display 616. In one aspect, the touch screen is matched to a display screen having one or more selectable touch keys 630 selectable by a user's touching of the associated area of the screen using a finger or a tool, such as a stylus pointer. A player enables a desired function either by touching the touch screen at an appropriate touch key 630 or by pressing an appropriate push button on the button panel. The touch keys 630 can be used to implement the same functions as push buttons. Alternatively, the push buttons 632, can provide inputs for one aspect of the operating the game, while the touch keys 630 can allow for input needed for another aspect of the game. The various components of the wagering game machine 600 can be connected directly to, or contained within, the housing 612, as seen in FIG. 6, or can be located outside the housing 612 and connected to the housing 612 via a variety of wired (tethered) or wireless connection methods. Thus, the wagering game machine 600 can comprise a single unit or a plurality of interconnected (e.g., wireless connections) parts which can be arranged to suit a player's preferences.

The operation of the basic wagering game on the wagering game machine 600 is displayed to the player on the primary display 614. The primary display 614 can also display the bonus game associated with the basic wagering game. The primary display 614 preferably takes the form of a high resolution LCD, a plasma display, an LED, or any other type of display suitable for use in the wagering game machine 600.

The size of the primary display 614 can vary from, for example, about a 2-3" display to a 15" or 17" display. In at least some embodiments, the primary display 614 is a 7"-10" display. In one embodiment, the size of the primary display can be increased. Optionally, coatings or removable films or sheets can be applied to the display to provide desired characteristics (e.g., anti-scratch, anti-glare, bacterially-resistant and anti-microbial films, etc.). In at least some embodiments, the primary display 614 and/or secondary display 616 can have a 16:9 aspect ratio or other aspect ratio (e.g., 4:3). The primary display 614 and/or secondary display 616 can also each have different resolutions, different color schemes, and different aspect ratios.

As with the free standing embodiments a wagering gaming machine, a player begins play of the basic wagering game on the wagering game machine 600 by making a wager (e.g., via the value input device 618 or an assignment of credits stored on the handheld gaming machine via the touch screen keys 630, player input device 624, or buttons 632) on the wagering game machine 600. In some embodiments, the basic game can comprise a plurality of symbols arranged in an array, and includes at least one payline 628 that indicates one or more outcomes of the basic game. Such outcomes can be randomly selected in response to the wagering input by the player. At least one of the plurality of randomly selected outcomes can be a start-bonus outcome, which can include any variations of symbols or symbol combinations triggering a bonus game.

In some embodiments, the player-accessible value input device 618 of the wagering game machine 600 can double as a player information reader 652 that allows for identification of a player by reading a card with information indicating the player's identity (e.g., reading a player's credit card, player ID card, smart card, etc.). The player information reader 652 can alternatively or also comprise a bar code scanner, RFID transceiver or computer readable storage medium interface. In one embodiment, the player information reader 652 comprises a biometric sensing device.

General

In this detailed description, reference is made to specific examples by way of drawings and illustrations. These examples are described in sufficient detail to enable those skilled in the art to practice the inventive subject matter, and serve to illustrate how the inventive subject matter can be applied to various purposes or embodiments. Other embodiments are included within the inventive subject matter, as logical, mechanical, electrical, and other changes can be made to the example embodiments described herein. Features or limitations of various embodiments described herein, however essential to the example embodiments in which they are incorporated, do not limit the inventive subject matter as a whole, and any reference to the invention, its elements, operation, and application are not limiting as a whole, but serve only to define these example embodiments. This detailed description does not, therefore, limit embodiments of the invention, which are defined only by the appended claims.

Each of the embodiments described herein are contemplated as falling within the inventive subject matter, which is set forth in the following claims.

What is claimed is:

1. A wagering game apparatus comprising:

a processor operable to execute a wagering game application that presents a wagering game upon which monetary value may be wagered; and a configuration module executable by the processor and operable to:

determine a presence or absence of one or more hardware modules, the one or more hardware modules including a video display device;

determine a hardware configuration in accordance with the presence or absence of a rendering engine in the video display device;

select a first service from a plurality of services for use with the rendering engine in the hardware configuration determined to have the rendering engine present, and select a second service from the plurality of services for use with the hardware configuration determined to lack the rendering engine, the plurality of services each providing an interface to the wagering game application.

2. The apparatus of claim 1, wherein the one or more hardware modules include a field programmable gate array (FPGA).

3. The apparatus of claim 1, wherein the one or more hardware modules includes a predetermined number of hardware modules.

4. The apparatus of claim 3, wherein the hardware modules include storage units.

5. The apparatus of claim 3, wherein the hardware modules include network interface cards.

6. The apparatus of claim 1, wherein the one or more hardware modules include memory and further wherein determining a hardware configuration includes determining a hardware configuration in accordance with a size of the memory.

7. A method of configuring a gaming machine, performed by a processor, comprising:

determining a presence or absence of one or more hardware modules, the one or more hardware modules including a video display device;

determining a hardware configuration in accordance with the presence or absence of a rendering engine in the video display device;

selecting at least one service from a plurality of services in accordance with the hardware configuration, the plurality of services each providing an interface to a wagering game application that presents a wagering game upon which monetary value may be wagered.

8. The method of claim 7, wherein the one or more hardware modules include a field programmable gate array (FPGA).

9. The method of claim 7, wherein the one or more hardware modules includes a predetermined number of hardware modules.

10. The method of claim 9, wherein the hardware modules include storage units.

11. The method of claim 9, wherein the hardware modules include network interface cards.

12. The method of claim 7, wherein the one or more hardware modules include memory and further wherein determining a hardware configuration includes determining a hardware configuration in accordance with a size of the memory.

13. The method of claim 7, wherein determining the presence or absence includes determining a version identification for the one or more hardware modules.

14. A non-transitory machine readable medium having machine executable instructions for causing one or more processors of a gaming machine to perform a method, the method comprising:

determining a presence or absence of one or more hardware modules, the one or more hardware modules including a video display device;

determining a hardware configuration in accordance with the presence or absence of a rendering engine in the video display device;

selecting at least one service from a plurality of services in accordance with the hardware configuration, the plurality of services each providing an interface to a wagering game application that presents a wagering game upon which monetary value may be wagered.

15. The machine readable medium of claim 14, wherein the one or more hardware modules include a field programmable gate array (FPGA).

16. The machine readable medium of claim 14, wherein the one or more hardware modules includes a predetermined number of hardware modules.

17. The machine readable medium of claim 16, wherein the hardware modules include storage units.

18. The machine readable medium of claim 16, wherein the hardware modules include network interface cards.

19. The machine readable medium of claim 14, wherein the one or more hardware modules include memory and further wherein determining a hardware configuration includes determining a hardware configuration in accordance with a size of the memory.

20. The machine readable medium of claim 14, wherein determining the presence or absence includes determining a version identification for the one or more hardware modules.

21. A wagering game system comprising:

a first wagering game unit operable to execute a wagering game application that presents a wagering game upon which monetary value may be wagered, the first wagering game unit having a first video hardware module;

a second wagering game unit operable to execute the wagering game application that presents a wagering game upon which monetary value may be wagered, the second wagering game unit having a second video hardware module different from the first hardware module; and a common operating system configured to be used by the first wagering game unit and the second wagering game unit, the common operating system configured to provide a first service when the first video hardware module is detected, and to provide a second service when the second video hardware module is detected, the second service being different from the first service wherein the first video hardware module includes a rendering engine and the second video hardware module lacks the rendering engine.

22. The method of claim 21, wherein the second service includes a rendering service.

23. A method of operating a plurality of gaming machines, performed by a processor on each of the plurality of gaming machines, the method comprising:

providing a common operating system on each of the plurality of gaming machines to execute a wagering game application that presents a wagering game upon which monetary value may be wagered, wherein at least one of the plurality of gaming machines includes a first video hardware module having a rendering engine, and at least one of the plurality of gaming machines includes a second video hardware module different from the first video hardware module;

determining the presence of the first video hardware module or the second video hardware module on each one of the plurality of gaming machines;

selecting a first service from a plurality of services for use with the first video hardware module in response to determining the presence of the first video hardware module; and selecting a second service from the plurality of services for use with the second video hardware module in response to determining the presence of the second video hardware module, the second service being different from the first service.

24. The method of claim 23, wherein the second service includes a rendering service.

* * * * *

UNITED STATES PATENT AND TRADEMARK OFFICE

CERTIFICATE OF CORRECTION

PATENT NO. : 8,282,477 B2
APPLICATION NO. : 12/595460
DATED : October 9, 2012
INVENTOR(S) : Dasgupta et al.

It is certified that error appears in the above-identified patent and that said Letters Patent is hereby corrected as shown below:

In the Specifications

In column 7, line 17, after "thereof", insert --.--, therefor.

In the Claims

In column 14, line 7, in claim 21, after "service", insert --;--, therefor.

Signed and Sealed this
Twenty-second Day of April, 2014

Michelle K. Lee

Michelle K. Lee
*Deputy Director of the United States Patent and Trademark Office*